D. D. ZANES.
DEVICE FOR TAKING UP SLACK IN SPROCKET CHAINS.
APPLICATION FILED APR. 1, 1918.
1,308,570.
Patented July 1, 1919.
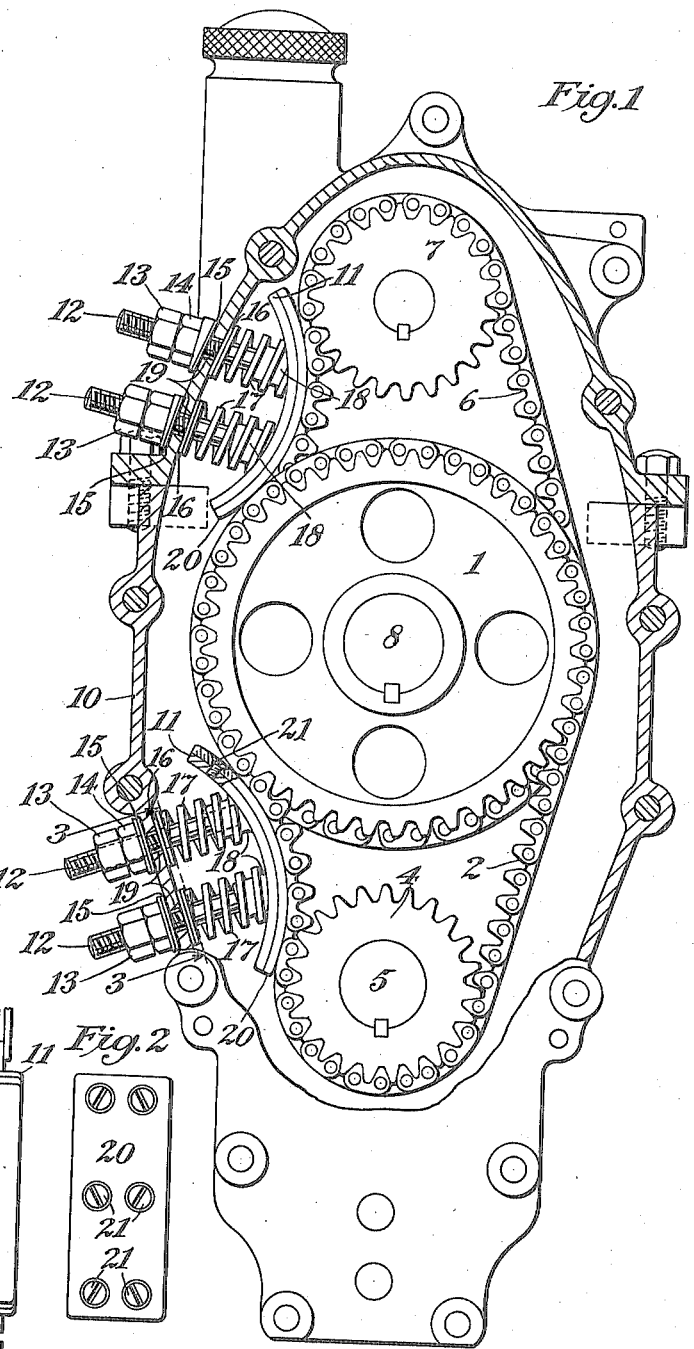
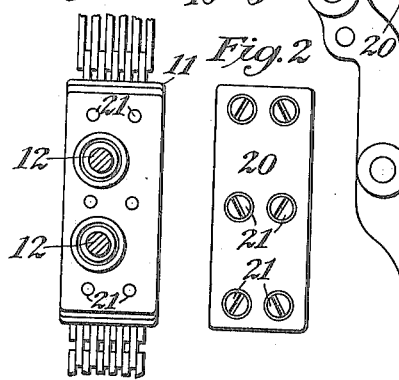
Inventor
Delaney Depew Zanes.
By his Attorney
Andrew Wilson.

UNITED STATES PATENT OFFICE.

DELANEY DEPEW ZANES, OF IRVINGTON, NEW JERSEY, ASSIGNOR TO DETROIT-CADILLAC MOTOR CAR CO., OF NEW YORK, N. Y., A CORPORATION OF NEW YORK.

DEVICE FOR TAKING UP SLACK IN SPROCKET-CHAINS.

1,308,570.   Specification of Letters Patent.   Patented July 1, 1919.

Application filed April 1, 1918. Serial No. 226,014.

*To all whom it may concern:*

Be it known that I, DELANEY DEPEW ZANES, a citizen of the United States, residing at Irvington, New Jersey, have invented certain new and useful Improvements in Devices for Taking up Slack in Sprocket-Chains, of which the following is a specification.

My invention relates to means for taking up the slack in driving chains which are adapted to travel over sprocket gears and which, because of wear, are apt to stretch so as to become slack and in danger of riding over the sprockets so as to break the chain or damage the mechanism. And my improvements are particularly applicable to the chains which are used to drive the timing shaft and the fan of an automobile.

I will now proceed to point out and explain the particulars of my invention, referring, in so doing, to the accompanying drawings in which Figure 1 is a front view of the sprockets and sprocket chains of an automobile, showing my improved device applied to take up the slack of the chains; Fig. 2 being a face view and Fig. 3 a back view taken on the line 3—3 of Fig. 1 looking to the right.

Similar parts are designated by corresponding reference numerals in all the figures.

The main sprocket 1 drives the chain 2 turning the sprocket 4 on the timing shaft 5; and the chain 6 driving the fan sprocket 7 is carried by a sprocket gear also mounted on the shaft 8 behind the gear 1, or integral therewith. The gears and chains are necessarily tightly inclosed in a casing 10, to exclude dust and to confine the oil with which they are liberally supplied. And it is quite inconvenient, in ordinary practice, to open this casing so as to obtain access to the chains for the purpose of replacing them, tightening them or making adjustments. In consequence of this it is desirable to provide means for keeping the chains taut, to compensate for stretching by wear, which means may be adjusted from time to time without the necessity of opening the casing 10.

I accomplish this by using a curved block 11 carried by arms 12, 12 screw-threaded to receive nuts 13, 14 and provided with suitable washers 15, 16, and a coiled spring 17, surrounding each arm and steadied by bosses 18, 18 at the bases of the arm 12.

These arms 12 pass through openings 19, 19 in the casing 10, the washers 15, 16 being adapted to make substantially oil proof closures on the inside and outside of the casing, and the springs 17, 17 being normally compressed so as to force the block 11 inward to the limit permitted by the nuts 13, 14.

Upon the face of the block 11 I secure a contact member 20 formed of hard fiber or other suitable material adapted to press against the chain without wearing it appreciably, and also without being itself worn away rapidly or injured by oil or grease. In practice I have found that hard fiber is well adapted for this purpose. And I have shown this element as being secured to the block 11 by screws 21, 21 tapped thereinto. But it will be understood that other well known means for securing the hard fiber to the backing block might be employed.

In practice, when the chains are new and normally taut, the nuts 13, 14 are screwed down on the arms 12, 12 so as to draw the block 11 well out toward the casing 10, so as not to press unduly against the chain. But as the chain becomes slack from use, the nuts 13, 14 may be slackened off so as to allow the springs 17, 17 to push the block 11 in against the chain, so as to take up any slack in the chain and to press with a yielding pressure continuously against the chain.

My improved slack take-up devices may be either applied in the first instance to the chains when the cars are made, or they may be put on when the occasion arises because of the slackening of a chain or chains by wear.

Having thus described my invention what I claim and desire to secure by Letters Patent of the United States is:

1. In an automobile sprocket chain tightener, the combination, of a non-rotating pressure member provided with an applied anti-friction face element, and yieldable means for pressing the same against the chain.

2. In an automobile sprocket chain tightener, the combination, of a non-rotating pressure member provided with a non-metallic anti-friction face element, and yieldable means for pressing the same against the chain.

3. In a sprocket chain tightener, the combination, of a non-rotating pressure member provided with an anti-friction face element composed of hard fiber, and yieldable means for pressing the same against the chain.

4. In a sprocket chain tightener, the combination, of a curved pressure member provided with an anti-friction facing element, and carried by a pair of arms having projection governing means and pressure exerting means associated therewith.

5. In an automobile sprocket chain tightener, the combination, of a curved pressure member provided with an applied anti-friction face element, longitudinally reciprocable carrying means, movement limiting means and pressing means associated therewith.

6. In an automobile sprocket chain tightener, the combination of a curved pressure element provided with a non-metallic anti-friction face element detachably attached thereto, longitudinally reciprocable carrying means, and means adapted to move the pressure element toward the chain and to hold it yieldably thereagainst.

7. In a sprocket chain tightener, the combination, with an automobile sprocket chain and a chain casing, of a curved, non-rotating pressure element provided with carrying arms passing through the chain casing and spring-means operating between the casing and the pressure element to yieldably press the pressure element toward the chain.

DELANEY DEPEW ZANES.